United States Patent
Maeder et al.

(10) Patent No.: US 8,923,874 B2
(45) Date of Patent: *Dec. 30, 2014

(54) METHOD FOR OPERATING A WIMAX FEMTOCELL BASE STATION AND FEMTOCELL BASE STATION

(71) Applicant: NEC Corporation, Tokyo (JP)

(72) Inventors: Andreas Maeder, Heidelberg (DE); Jun Zhou, London (GB); Michael Einhaus, Heidelberg (DE); Yuefeng Zhou, Oxshott (GB); Tetsu Ikeda, Kanagawa (JP); Linghang Fan, Surrey (GB)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,639

(22) Filed: Feb. 10, 2014

(65) Prior Publication Data
US 2014/0155077 A1    Jun. 5, 2014

Related U.S. Application Data

(62) Division of application No. 13/126,254, filed as application No. PCT/EP2009/007670 on Oct. 27, 2009, now Pat. No. 8,688,133.

(51) Int. Cl.
| | |
|---|---|
| *H04W 40/00* | (2009.01) |
| *H04W 4/00* | (2009.01) |
| *H04W 52/02* | (2009.01) |
| *H04W 72/08* | (2009.01) |
| *H04W 84/04* | (2009.01) |

(52) U.S. Cl.
CPC .............. *H04W 72/082* (2013.01); *Y02B 60/50* (2013.01); *H04W 52/0216* (2013.01); *H04W 52/0206* (2013.01); *H04W 84/045* (2013.01)
USPC ........................................ 455/450; 455/422.1

(58) Field of Classification Search
CPC ..... H04W 40/00; H04W 4/00; H04W 84/045; H04W 36/0083; H04W 24/02; H04W 40/20
See application file for complete search history.

(56) References Cited

U.S. PATENT DOCUMENTS

| | | | |
|---|---|---|---|
| 2008/0188265 A1* | 8/2008 | Carter et al. | ................... 455/561 |
| 2010/0016022 A1* | 1/2010 | Liu et al. | ....................... 455/561 |

FOREIGN PATENT DOCUMENTS

| | | |
|---|---|---|
| WO | 2007035446 | 3/2007 |
| WO | 2007035447 | 3/2007 |

OTHER PUBLICATIONS

"A method for interference control and power saving for home access point" IP. com Journal, IP. com Inc., West Henrietta, NY, US, Dec. 13, 2007, XP013122942. ISSN: 1533-0001, p. 1, line 1-p. 3, line 17.

(Continued)

*Primary Examiner* — Michael Faragalla
(74) *Attorney, Agent, or Firm* — Young & Thompson

(57) ABSTRACT

A method for operating a WiMAX femtocell base station, wherein the femtocell base station has an active operational mode, in which the radio interface subsystem of the femtocell base station is fully power supplied, is characterized in that a power saving mode with reduced radio interface activity is provided, wherein the femtocell base station is enabled to transit between the active operation mode and the power saving mode. Furthermore, a corresponding femtocell base station for deployment in a WiMAX network is disclosed.

13 Claims, 3 Drawing Sheets

(56) References Cited

OTHER PUBLICATIONS

Figure 1:
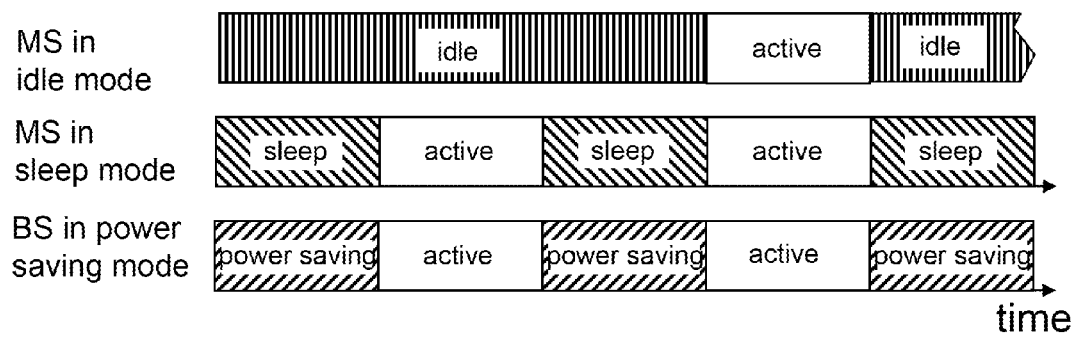

Anonymous: "Method to increase power efficiency in a mixed GSM/UMTS network" Research Disclosure, Mason Publications Hampshire, GB, vol. 471, No. 88, Jul. 1, 2003, XP007133045, ISSN: 0374-4353, p. 1, line 1-p. 5, line 10.

International Search Report, dated Feb. 9, 2010, from corresponding PCT application.

Method to increase power efficiency in a mixed GSM/UMTS network.

JP Office Action dated Aug. 19, 2013, with English translation; Application No. 2011-533597.

Guang Han, Hua Xu, Time synchronization for Femtocells, IEEE C802.16m-08/1090, IEEE 802.16 Task Group m (TGm), Sep. 5, 2008.

Maruti Gupta, Shantidev Mohanty, Nuthaiah Venkatachalam, Proposal for IEEE 802.16m Sleep Mode Operation, IEEE C802.16m-08/703rl, IEEE 802.16 Task Group m (TGm), Jul. 10, 2008.

Mo-Han Fong, Hang Zhang, Robert Novak, Sophie Vrzic, Jun Yuan, Dongsheng Yu, Hosein Nikopourdeilami, Kathiravetpillai Sivanesan, Proposed Text Changes on Final, SDD Text Proposal by AHG Chair for idle Mode, IEEE C802.16m-08/1197rl, IEEE 802-16 Task Group m (TGm), Sep. 15, 2008.

\* cited by examiner

METHOD FOR OPERATING A WIMAX FEMTOCELL BASE STATION AND FEMTOCELL BASE STATION

CROSS REFERENCE TO RELATED APPLICATIONS

This application is a division of application Ser. No. 13/126,254, filed on Oct. 12, 2011,, which is a National Stage of PCT/EP2009/007670, filed on Oct. 27, 2009,, which claims foreign priority to European Application Nos. 08253493.4, and 09251740.8, filed on Oct. 27, 2008, and Jul. 6, 2009, respectively. The entire contents of each of the above applications are hereby incorporated by reference.

BACKGROUND OF THE INVENTION

The present invention relates to a method for operating a WiMAX femtocell base station, wherein said femtocell base station has an active operational mode, in which the radio interface subsystem of said femtocell base station is fully power supplied.

DESCRIPTION OF THE RELATED ART

Furthermore, the present invention relates to a femtocell base station for deployment in a WiMAX network, wherein said femtocell base station has an active operational mode, in which the radio interface subsystem of said femtocell base station is fully power supplied.

There is currently an interest from mobile network operators to deploy so called femtocells (also known as home base stations, home BTS, picocells, home NBs, femtocell access points (FAPs), or femto radio base stations) which would be installed within the homes of the operators' customers (see for reference Airvana whitepaper, "Femtocells: Transforming The Indoor Experience"). Such femtocells are low power mobile base stations, currently being developed and standardized for both 3G and 4G networks, at the edge of the operator network. Installation of Femtocell BS will typically be handled by the customers themselves without any technical training; therefore it has to be a simple plug-and-play procedure. Femtocell base stations are connected to a normal broadband internet connection, and the radio interface is based on wide area cellular network standards such as WiMAX (Worldwide Interoperability for Microwave Access), UMTS (Universal Mobile Telecommunications System) or 3GPP LTE (Long Term Evolution).

One reason for the introduction of femtocells is the increase of operator network coverage for the sake of a better user experience and therewith to make a big step towards fixed-mobile-convergence Like Wi-Fi access points, femtocells are designed to be deployed in home and office environments in order to give good coverage in the respective area and deployment of high density is expected in areas with high population or office density. However, the deployment of femtocells comes along with drawbacks of which one is interference effects between macro and femto levels of the network. Since femtocell base stations are often deployed in the same licensed spectrum as the wide area network of the operator it is important to configure the radio interface correctly to avoid interference with other base stations.

SUMMARY OF THE INVENTION

The present invention focuses on femtocells based on the WiMAX and IEEE 802.16 standard. WiMAX is defined as World Wide Interoperability for Microwave Access based upon the standards family of IEEE 802.16. The technology employed for data transmission in WiMAX communication networks is called OFDMA (Orthogonal Frequency Division Multiple Access), which is based on the usage of a large number of closely spaced orthogonal subcarriers. The OFDMA frame structure is divided by subcarriers in frequency domain, and by symbols in time domain. Users will be assigned a two dimensional (time and frequency domains) allocation, called "burst", to transmit/receive data. WiMAX is a time-synchronized communication technology in which frames have to be transmitted contemporaneously.

It is an object of the present invention to improve and further develop a method for operating a WiMAX femtocell base station and a femtocell base station of the initially described type in such a way that, by employing mechanisms that are readily to implement, interferences with neighboring femtocells and macro cells as well as power consumption are significantly reduced.

In accordance with the invention, the aforementioned object is accomplished by a method comprising the features of claim 1. According to this claim such a method is characterized in that a power saving mode with reduced radio interface activity is provided, wherein said femtocell base station is enabled to transit between said active operation mode and said power saving mode.

Furthermore, the aforementioned object is accomplished by a femtocell base station comprising the features of independent claim 11. According to this claim, such a femtocell base station is characterized in that a power saving mode with reduced radio interface activity is provided, wherein said femtocell base station is enabled to transit between said active operation mode and said power saving mode.

According to the invention it has been recognized that interferences with other base stations in the neighborhood of the femtocell base station can be significantly reduced by the provision of a power saving mode with reduced radio interface activity. In case no action is required from the part of the femtocell base station (in the following shortly denoted FCBS), it can switch from its default active operational mode (which is the normal operation mode) to the power saving mode, thereby drastically reducing the load of the radio link and interference to adjacent femtocells and to co-existing macro- and umbrella cells. Due to the reduced radio interface activity the power saving mode can be regarded and is meanwhile denoted as low-duty operation mode.

In current cellular system standards like IEEE 802.16,, the power saving is considered for WiMAX mobile stations (MSs) only. In addition, the method according to the present invention integrates the power saving mode into femtocell base stations which has not been considered at all so far. Besides the above mentioned interference reduction, the advantages of a power saving mode for FCBSs are manifold. In this context it is important to note that FCBSs are devices which are expected to be installed by the costumers themselves and are therefore located within the premises of the costumers. This means that aspects like energy consumption and electric field radiation are important factors, e.g. when thinking of green radio, which may influence the acceptance of the product. An FCBS in power saving mode does not only consume less power, but also emits less radiation and has a reduced average EIRP (equivalent isotropically radiated power) due to the reduced radio interface activity. Consequently, deployment of FCBS according to the present invention proves to be particularly advantageous in environments with low radiation requirements, like in hospitals for instance.

Since the present invention can be built mostly on standard procedures, modifications of existing products are minimal and incompatibilities with existing products are very unlikely.

According to a preferred embodiment it may be provided that the femtocell base station enters at the power saving mode either if no mobile station is connected to the FCBS or in case all connected mobile stations are in idle or in sleep mode. Moreover, a transition from active mode to power saving mode may be applied when all active mobile stations are required to switch to the macro cell base station, for instance initiated due to network controlled load balancing. The FCBS may not enter the power saving mode if any connected mobile station is in active/scanning mode. In any case, upon entering power saving mode, the FCBS has to insure time synchronization with connected mobile stations.

Advantageously, it may be provided that in power saving mode the femtocell base station cycles through a configurable number of power saving windows. The number of power saving windows may be defined by the operator or vendor of the femtocell or may be signaled by higher layers. For instance, either a fixed number of power saving windows may be defined, or an "infinite number" until a certain condition is met. The length of a power saving window may be counted in frames or in superframes (corresponding to 4 frames in WiMAX) depending on the desired degree of granularity.

According to a preferred embodiment each power saving window includes a power saving frame/interval (in IEEE 802.16m/D2, also called "unavailable interval") and synchronization frames/interval (in IEEE 802.16m/D2, also called "available interval"), counted in frames or superframes. While during the unavailable intervals there is no radio activity at all, i.e. the FCBS does not transmit any signal on the air interface, during the available intervals the FCBS behaves like a normal FCBS performing all kind of activities an FCBS in normal active operational mode does. Among other things, the available intervals may be employed for synchronization with connected mobile stations. Additionally, the available intervals may be employed by the FCBS for sending synchronization frames to assign uplink transmission opportunities to the connected mobile stations.

It is important to note that the FCBS unavailable intervals alternate with available intervals in such a way that the normal operation of the connected mobiles stations is not affected. This presumes that the FCBS available intervals are congruent with the superposition of all available intervals of connected mobile stations in sleep mode, and that the FCBS available intervals also cover paging cycles of mobile stations which are in idle mode. Additionally, a configurable sequence of available and unavailable intervals can be configured by the operator, such that the FCBS is available at guaranteed time intervals. These intervals can also be used by the FCBS to facilitate synchronization with unconnected mobile stations being located in its coverage area. For instance, this could be used for facilitating scanning and network entry of the mobile stations.

According to a preferred embodiment, during the above mentioned unavailable intervals the FCBS may be operated with the radio interface subsystem being completely switched off. Such implementation results in maximum energy saving and electric filed radiation reduction.

According to an alternative embodiment it may be provided that the radio interface subsystem of the femtocell base station is switched on also during unavailable intervals, but that the femtocell base station is configured to omit the sending of a configurable number of frames, which may include frame header information. For instance, a configuration may be chosen according to which the femtocell base station transmits only every forth superframe (compared to the operation in normal operation mode).

Regarding a transition from power saving mode to active mode ("wake up") it proves to be advantageous to distinguish different scenarios. For instance, in case of mobile stations in sleep mode connected to the FCBS or mobile stations in idle mode it may be provided that the femtocell base station wakes up upon receiving a signaling message from that mobile station. For instance, a mobile station may signal an event-triggered message to the FCBS, e.g. a ranging code similar to a bandwidth request. In this case, the FCBS may be configured to enter active/normal operation mode and to subsequently signal the mobile station to enter active/normal operation mode as well.

Another scenario relates to mobile stations in active mode not being connected to the FCBS and entering the coverage area of the FCBS. In this case the FCBS may just use the uplink received signal power (URSP), i.e. without decoding of signal contents, of the entering mobile station to decide whether it enters active mode or not. According to a specific implementation, a threshold may be a specified and the wake up of the FCBS may be executed in case the measured URSP exceeds that threshold. In this case it is to be assumed that the mobile station is close enough to the FCBS so that the FCBS can serve the mobile station. After the transition of the FCBS from the power saving mode to active mode, the mobile station will be able to detect the FCBS during scanning mode.

A further scenario relates to the mobile station in idle mode which is not connected to the FCBS and which is entering the coverage area of the FCBS. In this case it may be provided that the FCBS first keeps staying in power saving mode until there is a message exchange between the mobile station and the connected macro cell base station. Upon such message exchange the FCBS can measure the URSP of the mobile station and can decide whether to wake up or not, as described above.

BRIEF DESCRIPTION OF THE DRAWING FIGURES

Figure 2:
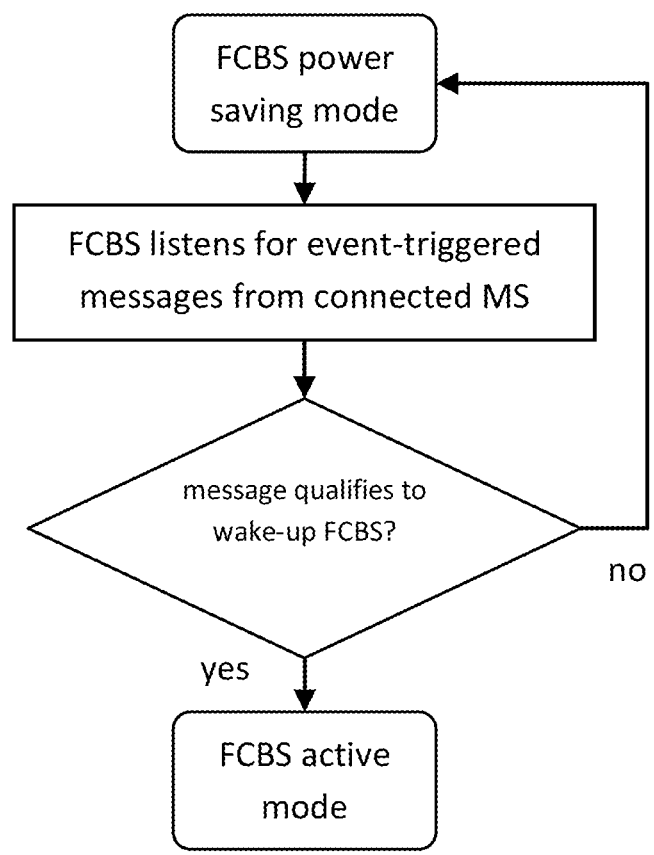
Figure 3:
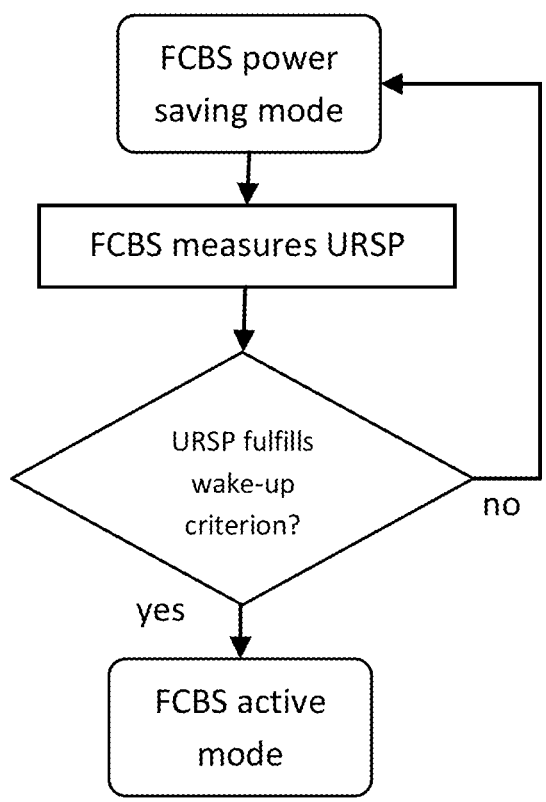

There are several ways how to design and further develop the teaching of the present invention in an advantageous way. To this end, it is to be referred to the patent claims subordinate to patent claim 1 and to the following explanation of preferred examples of embodiments of the invention, illustrated by the figures. In connection with the explanation of the preferred examples of embodiments of the invention by the aid of the figures, generally preferred embodiments and further developments of the teaching will be explained. In the drawings FIG. 1 illustrates an operation scheme of a femtocell base station in power saving mode according to an embodiment of the present invention, FIG. 2 is a flow diagram illustrating an exemplary wake-up procedure for a connected mobile station in sleep mode or in idle mode, and FIG. 3 is a flow diagram illustrating an exemplary wake-up procedure for an unconnected mobile station in sleep or in active mode.

DETAILED DESCRIPTION OF THE INVENTION

FIG. 1 illustrates an exemplary embodiment of a power saving mode of a femtocell base station FCBS. When the FCBS has made a transition from active mode to power saving mode, it cycles through an alternating sequence of available intervals (shown as power saving frames) and unavailable intervals (shown as active frames), where each pair forms a power saving window. Upon entering power saving mode, the FCBS has to ensure that the unavailable and available intervals and the sleep and listening windows of the FCBS and connected MSs are congruent. As can be obtained from FIG. 1, the available and unavailable intervals are synchronized in such a way that the available intervals, i.e. the active frames, which carry downlink control information, and the listen/active windows of the mobile stations MSs are congruent. This holds true for both mobile stations MSs in sleep mode as well as for mobile stations MSs in idle mode.

It is to be noted that the available intervals of the FCBS may include synchronization frame(s) that may be employed for signaling uplink transmission opportunities to the connected MSs. To this end the MSs may send dedicated frequency and time range requests to the FCBS in order to get resources assigned. Alternatively, the MSs may send a dedicated uplink signal, like a ranging CDMA (Code Division Multiple Access) code in the UL (uplink) MAC frame. The MS may position the ranging code within the UL MAC frame in a specific frequency-time-range which may be predefined, e.g. by the operator.

FIG. 2 is a flow diagram illustrating an embodiment of a wake-up procedure of the FCBS with connected MSs being in sleep mode or with idle MSs. In a connected state information exchange between the FCBS and the MS, e.g. with respect to authentification, authorization, etc., has already taken place. The FCBS being in power saving mode listens for event-triggered messages from connected MSs. For instance, a dedicated signal type like a special ranging code directed from the MS to the FCBS may constitute such event-triggered message. The FCBS is equipped with decision means to analyze the message and to decide whether to wake up or not. In case the message received from a connected MS qualifies to the specified wake-up criteria, the FCBS will perform a transition from the power saving mode to the active operational mode. Otherwise the FCBS will cycle though the next power saving window.

FIG. 3 is a flow diagram illustrating an embodiment of a wake-up process for unconnected mobile stations in sleep mode or in active mode. In an unconnected state there has been no information exchange between the FCBS and the MS. The FCBS being in power saving mode performs measurements of the URSP (Uplink Received Signal Power) or similar metrics of mobile stations entering into the coverage area of the FCBS. These measurements can be performed on a regular bases that may be implemented e.g. by the vendor. According to the configuration illustrated in FIG. 3, the FCBS has implemented a threshold for the URSP. In case the URSP measured for a MS exceeds the specified threshold, the wake-up criterion is fulfilled, and the FCBS performs a transition from power saving mode to active mode. Otherwise, the FCBS continues to stay in power saving mode and enters into the next power saving window.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for transiting a femtocell base station between at least two operation modes in a system including one or more mobile stations being capable of connecting to the femtocell base station, wherein the one or more mobile stations is capable of switching between i) a connected state with the mobile station connecting to the femtocell base station, and ii) an idle state with the mobile station not establishing a connection with the femtocell base station,
   said two operation modes of the femtocell base station including a normal operation mode and a low-duty operation mode with reduced radio interface activity, the method comprising:
   when operating said femtocell base station in the normal operation mode, detecting if there are no mobile stations in the connected state, and
   based on detecting if there are no mobile stations in the connected state, transiting said femtocell base station from said normal operation mode to said low-duty operation mode with reduced radio interface activity in order to reduce interference to neighbor cells.

2. The method according to claim 1, wherein said low-duty operation mode has available intervals and unavailable intervals.

3. The method according to claim 1, wherein said low-duty operation mode cycles through an alternating sequence of available interval and unavailable interval.

4. The method according to claim 2, wherein during said unavailable intervals, said femtocell base station does not transmit any signal on the air interface.

5. The method according to claim 2, wherein during said available intervals, said femtocell base station performs normal operation, including transmission of a signal on the air interface.

6. The method according to claim 2, wherein said available intervals and said unavailable intervals are counted in superframes.

7. A femtocell base station configured to:
   transit between at least two operation modes in a system including one or more mobile stations being capable of connecting to the femtocell base station, wherein the one or more mobile stations is capable of switching between i) a connected state with the mobile station connecting to the femtocell base station, and ii) an idle state with the mobile station not establishing a connection with the femtocell base station,
   wherein the operation modes of said femtocell base station include a normal operation mode, and a low-duty operation mode with reduced radio interface activity, and
   wherein when operating said femtocell base station in the normal operation mode, said femtocell base station detects if there are no mobile stations in the connected state, and based on detecting if there are no mobile stations in the connected state, said femtocell base station transits from said normal operation mode to said low-duty operation mode with reduced radio interface activity in order to reduce interference to neighbor cells.

8. The mobile network system according to claim 7, wherein said low-duty operation mode has available intervals and unavailable intervals.

9. The mobile network system according to claim 7, wherein said low-duty operation mode cycles through an alternating sequence of available interval and unavailable interval.

10. The mobile network system according to claim 8, wherein during said unavailable intervals, said femtocell base station does not transmit any signal on the air interface.

11. The mobile network system according to claim 8, wherein during said available intervals, said femtocell base station performs normal operation, including transmission of a signal on the air interface.

12. The mobile network system according to claim 8, wherein said available intervals and said unavailable intervals are counted in superframes.

13. A method for a femtocell base station, comprising:
for a femtocell base station that includes at least two operation modes including a normal operation mode and a low-duty operation mode with reduced radio interface activity, operating the femtocell base station in a normal operation mode with the femtocell base station being connected to one or more mobile stations, the one or more mobile station capable of connecting to the femtocell base station, wherein the one or more mobile stations switches between i) a connected state with the mobile station connecting to the femtocell base station, and ii) an idle state with the mobile station not establishing a connection with the femtocell base station operating in one of an idle mode, a sleep mode, and an active mode; and
while operating said femtocell base station in the normal operation mode, said femtocell base station detecting if there are no mobile stations in the connected state, and
based on detecting if there are no mobile stations in the connected state, transiting said femtocell base station from said normal operation mode to said low-duty operation mode with reduced radio interface activity in order to reduce interference to neighbor cells.

* * * * *